United States Patent
Chou et al.

(10) Patent No.: US 7,212,919 B2
(45) Date of Patent: May 1, 2007

(54) GUIDE ROUTE GENERATION METHODS AND SYSTEMS

(75) Inventors: Shih-Chun Chou, Taiepi (TW); Wen-Tai Hsieh, Taipei (TW); Yung-Fang Yang, BeiTou Township, Changhua County (TW)

(73) Assignee: Institute for Information Industry, Taipei (TW)

( * ) Notice: Subject to any disclaimer, the term of this patent is extended or adjusted under 35 U.S.C. 154(b) by 152 days.

(21) Appl. No.: 11/047,030

(22) Filed: Jan. 31, 2005

(65) Prior Publication Data
US 2006/0129312 A1    Jun. 15, 2006

(30) Foreign Application Priority Data
Dec. 15, 2004  (TW) ............... 93138932 A

(51) Int. Cl.
*G01C 21/00*  (2006.01)
(52) U.S. Cl. .................. 701/209; 701/210; 701/202
(58) Field of Classification Search ............ None
See application file for complete search history.

(56) References Cited

U.S. PATENT DOCUMENTS

| | | | | |
|---|---|---|---|---|
| 5,963,948 A | * | 10/1999 | Shilcrat ............... 707/100 |
| 6,205,396 B1 | * | 3/2001 | Teicher et al. .......... 701/200 |
| 6,321,158 B1 | * | 11/2001 | DeLorme et al. ........ 701/201 |
| 6,460,036 B1 | * | 10/2002 | Herz ................ 707/10 |
| 7,050,988 B2 | * | 5/2006 | Atcheson et al. ......... 705/10 |
| 2005/0192025 A1 | * | 9/2005 | Kaplan ............. 455/456.1 |

* cited by examiner

Primary Examiner—Michael J. Zanelli
(74) Attorney, Agent, or Firm—Thomas, Kayden, Horstemeyer & Risley

(57) ABSTRACT

Guide route generation methods and systems. A target object is first selected by a visitor. The similarity or interest of candidate objects corresponding to the target object is calculated. Recommended objects are selected from the candidate objects according to the corresponding similarity or interest. A guide route is generated to link the recommended objects. The interest of the visitor is dynamically determined. If the interest is changed, the interest of the candidate objects is re-calculated, and recommended objects are re-selected from the candidate objects to generate a new guide route.

12 Claims, 4 Drawing Sheets

GUIDE ROUTE GENERATION METHODS AND SYSTEMS

BACKGROUND

The present disclosure relates generally to guide route generation methods and systems, and more particularly, to methods and systems that dynamically recommend and plan guide routes according to user interests.

In museums, visitors select and find exhibits by themselves, and operate devices such as PDAs to hear descriptions of exhibits. The exhibits, however, are numerous in a museum, and the time for respective visitors is limited. Visitors may have difficulty visiting all exhibits in the available time.

Therefore, it is required for museums to recommend visit plans, such as guide routes. Conventionally, guide routes are manually planned by experts based on related field knowledge. Since guide routes are fixed, they cannot fulfill all requirements of disparate visitors. Additionally, fixed guide routes cannot be dynamically updated according to changes in exhibitions in museums.

SUMMARY

Guide route generation methods and systems are provided. In an exemplary embodiment of a guide route generation method, a target object is first selected by a visitor. The similarity or interest between respective candidate objects and the target object is calculated. Recommended objects are selected from the candidate objects according to the corresponding similarity or interest. A guide route is generated to link the recommended objects. The interest of the visitor is dynamically determined. If the interest is changed, the interest for the candidate objects is re-calculated, and recommendation objects are re-selected from the candidate objects for generating a new guide route.

An exemplary embodiment of a guide route generation system comprises a relation analysis module, a route generation module, and an adjustment module. The relation analysis module calculates the similarity or interest between respective candidate objects and a target object selected by a visitor, and selects recommended objects from the candidate objects according to the corresponding similarity or interest. The route generation module generates a guide route to link the recommended objects. The interest of the visitor is dynamically determined. If the interest is changed, the adjustment module re-calculates the interest for the candidate objects, re-selects recommendation objects from the candidate objects for the route generation module to generate a new guide route.

Guide route generation methods may take the form of program code embodied in a tangible media. When the program code is loaded into and executed by a machine, the machine becomes an apparatus for practicing the disclosed method.

DESCRIPTION OF THE DRAWINGS

The invention will become more fully understood by referring to the following detailed description with reference to the accompanying drawings, wherein.

DESCRIPTION

Guide route generation methods and systems are provided.

Figure 1:
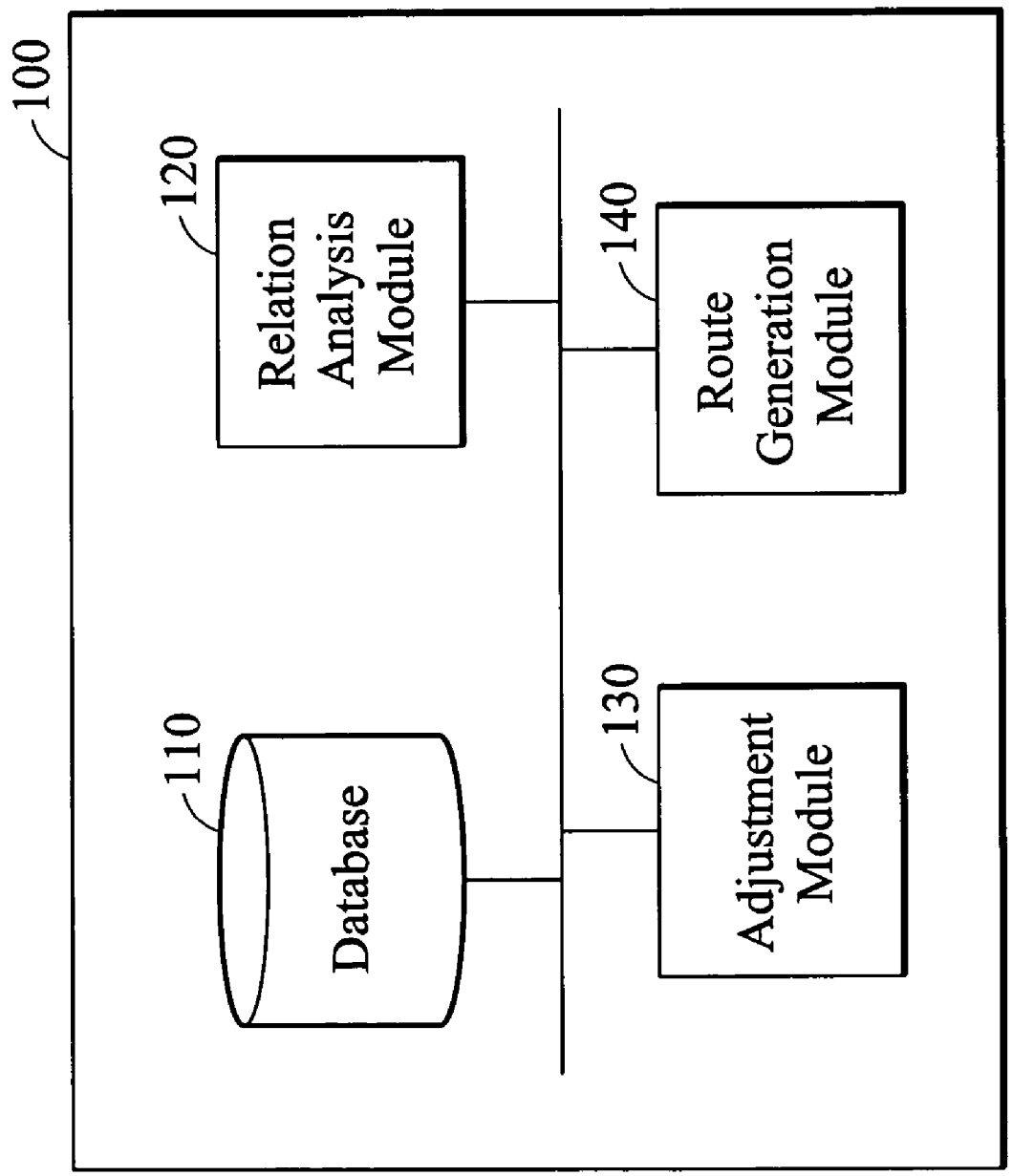
FIG. 1 is a schematic diagram illustrating an embodiment of a guide route generation system.

FIG. 1 is a schematic diagram illustrating an embodiment of a guide route generation system.

The guide route generation system 100 comprises a database 110, a relation analysis module 120, an adjustment module 130, and a route generation module 140. The database 110 records environment parameters, such as visitor information and context information. The visitor information comprises personal data, preference information, visit purpose, available visit time, friends that visit together, and others. The context information comprises object (exhibit) information, such as object value, location information, such as relative distance between an object and a specific position, space information, such as capacity and open hours for an object, activity information, such as exhibit subject, and others. In some embodiments, the visitor information and context information can be constructed based on ontology technology and stored in an ontology database constructed accordingly. The ontology database stores concept units and relations therebetween for objects in knowledge fields. Ontology technology, known in the field of knowledge management, is omitted here. Additionally, the database 110 further records the visit behavior of different visitors. For example, the visit behavior comprises visit time, operating situation and interest grading for respective visitors, and the amount and number per unit time of visitors for a specific object.

The relation analysis module 120 calculates the similarity between objects, and calculates the interest for respective candidate objects corresponding to a specific target object. The relation analysis module 120 selects recommended objects from the candidate objects according to the corresponding similarity or interest. The selected recommended objects have a similarity or interest having a value exceeding than a threshold. Since objects express knowledge, and each object comprises one or multiple concept units, relations exist between objects. The relations may be linear connections and collateral connections. For example, the recommended objects may comprise dinosaur fossils for visitors want to visit dinosaurs and fossils, and the recommended objects comprise animal exhibits for visitors want to visit animals. The system analyzes visit preferences of visitors using concept-based evaluation methods in ontology, to calculate the interest for respective exhibits. The equation for calculating similarity between objects is as follows:

$$\mathrm{Sim}(T1,T2)=(\alpha*(\mathrm{avg}(\mathrm{Score}(\ )))),$$

in which, if $T1i=T2j$, $\mathrm{Score}(A(T1i,T2j))=1$, otherwise, $\mathrm{Score}(A(T1i,T2j))=\mathrm{level}(A(T1i,T2j))/HL$, where $T1i$ and $T2j$ are two points in the same concept tree, and $A(T1i,T2j)$ is a common ancestor of $T1i$ and $T2j$. Additionally, $\mathrm{level}(A(T1i,T2j))$ represents the position (level) of a common ancestor of concept units corresponding to two objects in a concept tree, HL is the highest level in the concept tree. Further, $\mathrm{Distribution}(T1,T2)=(\mathrm{Tree}\{\mathrm{Def}(T1)\}\cap\mathrm{Tree}\{\mathrm{Def}(T2)\})/(\mathrm{Tree}\{\mathrm{Def}(T1)\}\cup\mathrm{Tree}\{\mathrm{Def}(T2)\})$, and α=Distribution(T1,T2), in which Tree{Def( )} represents the number of concept trees that concept units corresponding to objects located therein.

Figure 2:
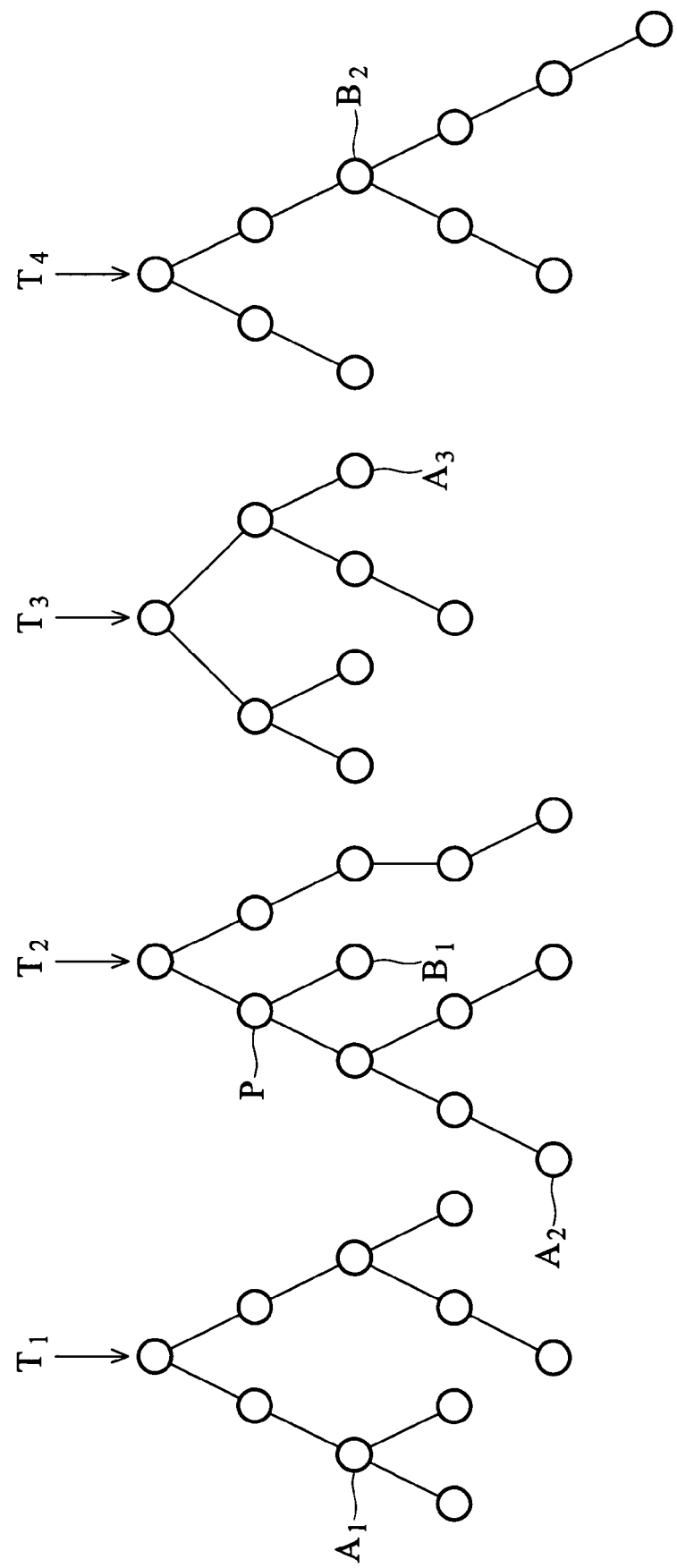
FIG. 2 is a schematic diagram illustrating an example of a concept tree.

In other words, the similarity between two objects is determined according to the position of a common ancestor of concept units corresponding to the objects in a concept tree, and the joint relation of concept trees of concept units corresponding to the respective candidate objects and the target object located therein. For example, referring to FIG. 2, a first object comprises three concept units (A1, A2, A3), respectively located in three concept trees (T1, T2, T3). A second object comprises two concept units (B1, B2), respectively located in two concept trees (T2, T4). If only the common concept units A2 and B1 are in the concept tree T2 having the highest level 5, and the location of the common ancestor P of the concept units is level 2 of the concept tree, the Score( ) for the objects is $2/5$. Additionally, α for the objects is $1/4$ (only one concept tree is jointed). Thus, the similarity between the objects is $1/4 * 2/5 = 1/10$. Additionally, interest for one object can be determined by multiplying the similarity between the object and a target object by the interest for the target object. It is understood that the similarities and interests for objects can be stored in the database 110.

The interest for the target object can be determined by visitors. The adjustment module 130 calculates and predicts interest for objects not visited using the visit behavior of visitors based on the user behavior collaborative recommendation model. Visit behavior comprises visited objects, grading result (interest setting), device operating situation, visited time, and differences between visited and recommended routes. Further, the adjustment module 130 calculates and predicts interest for objects using a content-based model according to object information, such as classification, name, introduction, generation or age, characteristic, feature, subject, owner, object context, and others. For example, the interest for an object that has not been visited can be calculated according to the content similarity therebetween. It is understood that visit behavior must be transformed into scores according to predefined mapping rules, and normalized. Additionally, after a predetermined time, or if interest dynamically determined for an object by a visitor does not conform to the original interest, the adjustment module 130 re-calculates the interests for respective objects according to visit behavior or object information, and re-selects recommended objects therefrom.

The route generation module 140 generates a guide route to link the recommended objects selected by the relation analysis module 120 and the adjustment module 130 according to a route planning algorithm, such as Dijkstra's algorithm. It is understood that when adjustment module 130 re-calculates the interests of respective objects, and re-selects the recommended objects, route generation module 140 generates a new guide route to link the new recommended objects.

Figure 3:
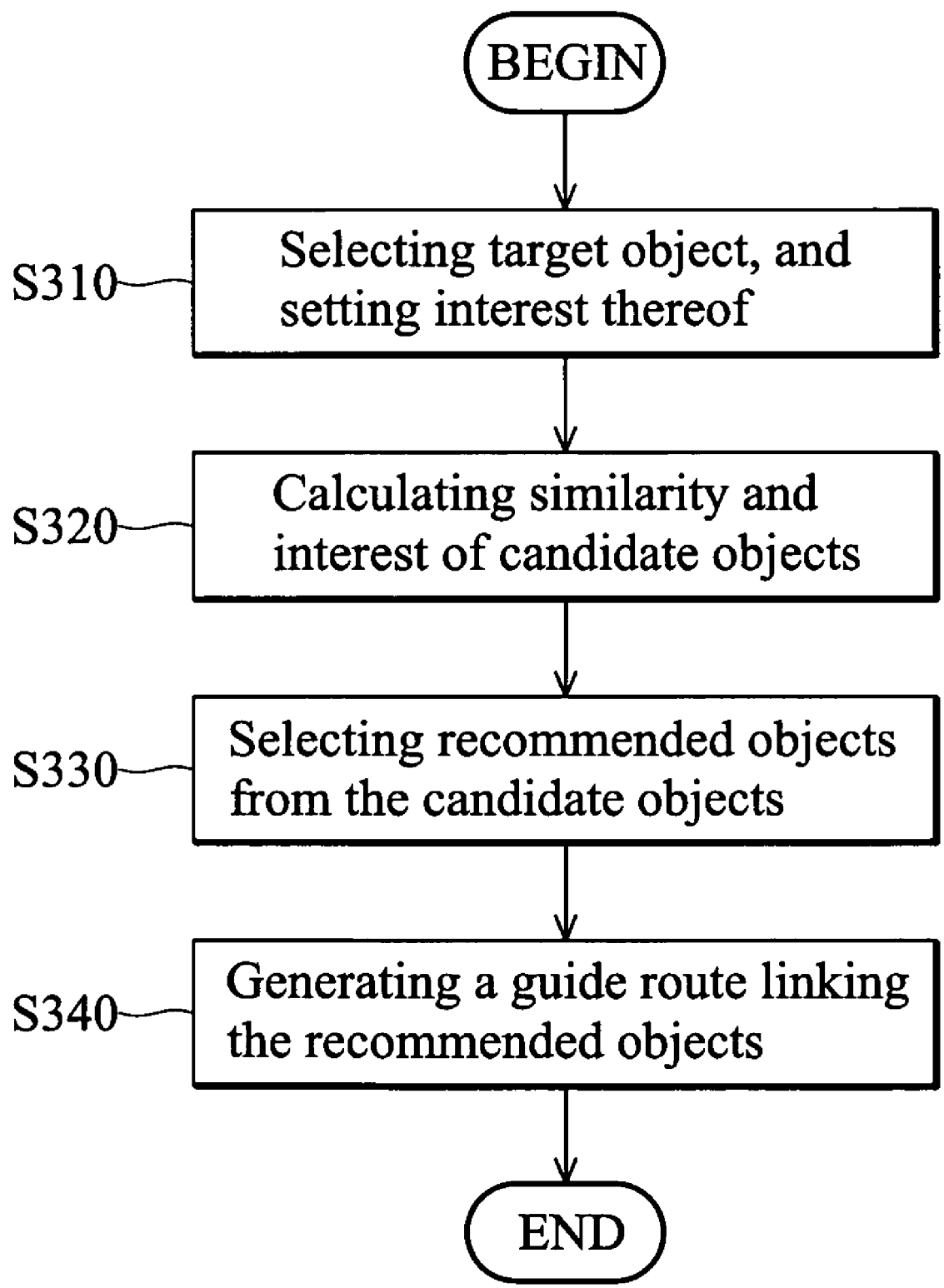
FIG. 3 is a flowchart of an embodiment of a guide route generation method.

FIG. 3 is a flowchart of an embodiment of a guide route generation method.

In step S310, a target object is selected from a plurality of candidate objects, and the interest for the target object is selectively set. In step S320, the similarity and interest between respective candidate objects and the target object is calculated. The similarity between respective candidate objects and the target object is determined according to the position of a common ancestor of concept units corresponding to the respective objects and the target object in a concept tree, and the joint relation of concept trees of concept units corresponding to the respective candidate objects and the target object located therein. The interest for respective candidate objects is determined by multiplying the similarity between the respective candidate objects and the target object by the interest for the target object. In step S330, recommended objects are selected from the candidate objects according to the corresponding interest. The interest for the respective recommended objects is exceeding than a threshold. Additionally, the number of selected recommended objects can be determined by the estimated visit time of visitors. In step S340, a guide route is generated to link the recommended objects according to the environment parameters using a route planning algorithm. It is understood that if the interest of the target object is not set in step S310, the interest of the target object can be automatically set as a predefined value. In some embodiments, if the interest of the target object is not set, the recommended objects can be selected according to the similarity thereof.

Figure 4:
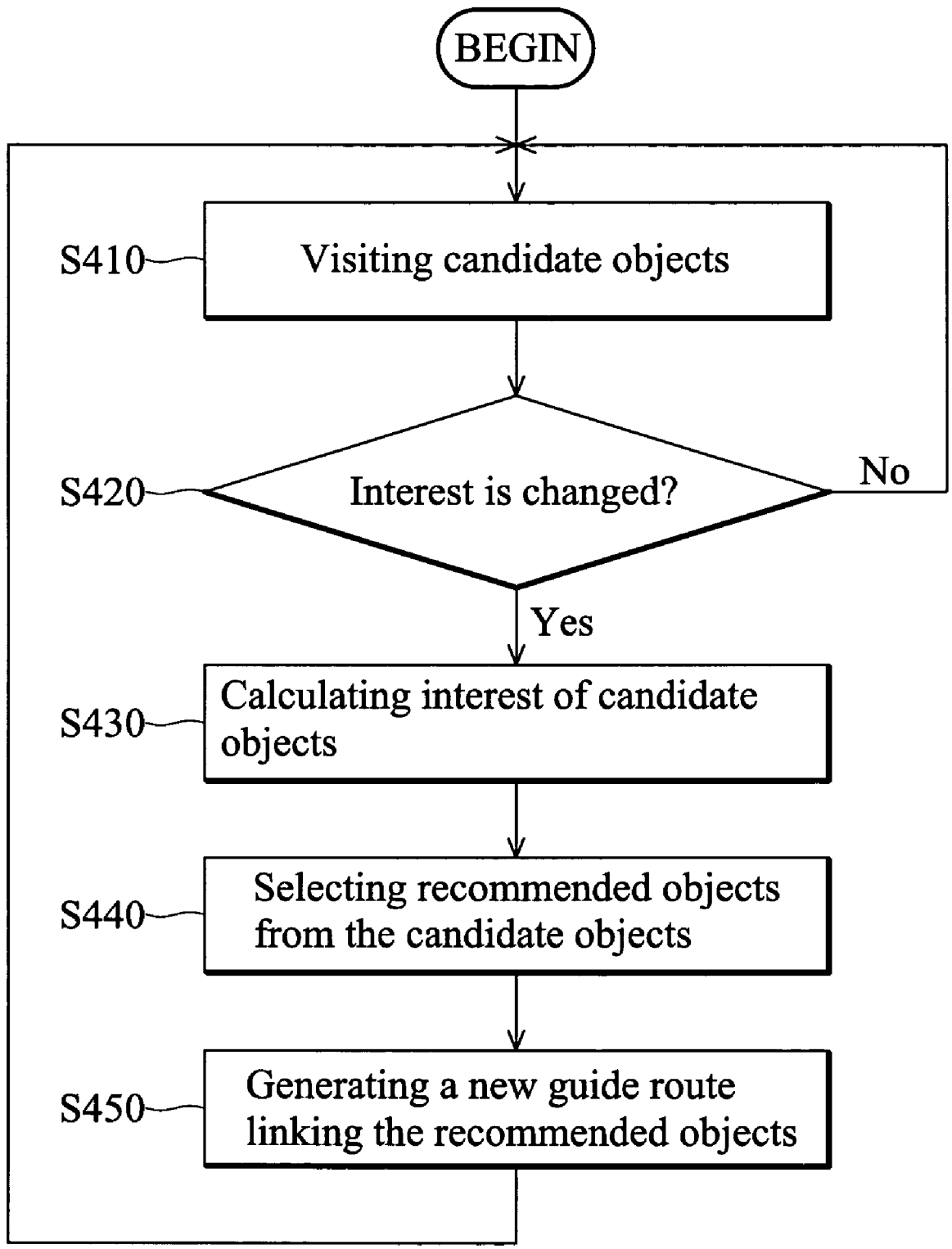
FIG. 4 is a flowchart of an embodiment of a guide route adjustment method.

FIG. 4 is a flowchart of an embodiment of a guide route adjustment method.

After the guide route is generated, in step S410, the visitor begins to visit the candidate objects, thus generating visit behavior comprising visited objects, interest setting, device operating situation, visited time, and differences between visited and recommended routes. The differences between visited and recommended routes can be determined by checking whether the visited objects are recommended objects. In step S420, it is determined whether the interest of the visitor is changed. It is understood that if the visited route and guide route are different or if the interest dynamically determined for a candidate object does not conform to the original interest, the interest of the visitor is changed. If the interest is not changed (No in step S420), the procedure returns to step S410. If so (Yes in step S420), in step S430, the interest for respective candidate objects is re-calculated. The interest can be calculated according to the visit behavior or the content similarity between the respective candidate objects and visited objects. In step S440, the recommended objects are re-selected from the candidate objects according to the corresponding interest. The number of selected recommended objects can be determined by the remaining visit time. In step S450, a new guide route is generated to link the new recommended objects. The procedure returns to step S410, and the visitor continues to visit the candidate objects.

Guide route generation methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A guide route generation method, comprising:
   selection of a target object by a visitor;
   calculating the similarity between respective candidate objects and the target object, where the similarity for respective candidate objects is determined according to the position of a common ancestor of concept units corresponding to the respective candidate objects and the target object in a concept tree;
   selecting recommended objects from the candidate objects according to the corresponding similarity; and
   generating a guide route to link the recommended objects.

2. The method of claim 1 further comprising determining the similarity for respective candidate objects according to the joint relation of concept trees of concept units corresponding to the respective candidate objects and the target object located therein.

3. The method of claim 1 further comprising:
   setting an interest for the target object;
   calculating an interest for respective candidate objects according to the interest for the target object and the similarity for respective candidate objects; and
   selecting the recommended objects from the candidate objects according to the corresponding interest.

4. The method of claim 3 further comprising:
   dynamically determining visitor interest for the candidate objects by the visitor; and
   if the interests do not conform to the original interests of the candidate objects,
   re-calculating the interest for the candidate objects;
   re-selecting recommendation objects from the candidate objects according to the corresponding interest; and
   generating a new guide route to link the recommended objects.

5. The method of claim 4 further comprising adjusting the interest for respective candidate objects according to visit behavior.

6. The method of claim 4 further comprising adjusting the interest for respective candidate objects according to object information thereof.

7. A guide route generation system, comprising:
   a relation analysis module calculating the similarity between respective candidate objects and a target object selected by a visitor, and selecting recommended objects from the candidate objects according to the corresponding similarity, where the similarity for respective candidate objects is determined according to the position of a common ancestor of concept units corresponding to the respective candidate objects and the target object in a concept tree; and
   a route generation module generating a guide route to link the recommended objects.

8. The system of claim 7 wherein the relation analysis module further determines the similarity for respective candidate objects according to the joint relation of concept trees of concept units corresponding to the respective candidate objects and the target object located therein.

9. The system of claim 7 wherein the relation analysis module further sets an interest for the target object, calculates an interest for respective candidate objects according to the interest for the target object and the similarity for respective candidate objects and selects the recommended objects from the candidate objects according to the corresponding interest.

10. The system of claim 9 further comprising an adjustment module receiving a dynamic setting of visitor interest for the candidate objects, and if the interests do not conform to the original interests of the candidate objects, re-calculating the interest for the candidate objects, re-selecting recommendation objects from the candidate objects according to the corresponding interest, and generating a new guide route to link the recommended objects.

11. The system of claim 10 wherein the adjustment module further adjusts the interest for respective candidate objects according to visit behavior.

12. The system of claim 10 wherein the adjustment module further adjusts the interest for respective candidate objects according to object information thereof.

* * * * *